Aug. 7, 1951     H. A. KISNER     2,563,047
HELICOPTER ROTOR CONTROL
Filed June 19, 1947     2 Sheets-Sheet 1
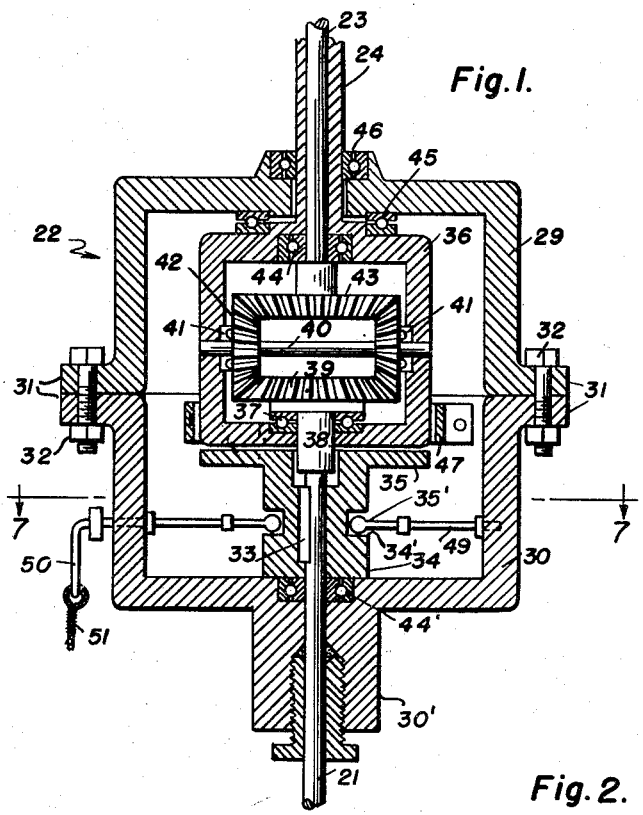
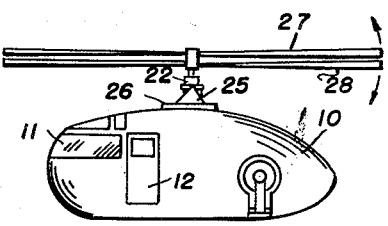
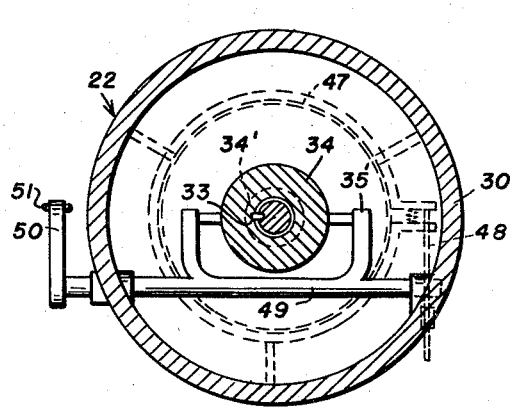
Inventor
Howard A. Kisner Aug. 7, 1951     H. A. KISNER     2,563,047
HELICOPTER ROTOR CONTROL
Filed June 19, 1947     2 Sheets-Sheet 2
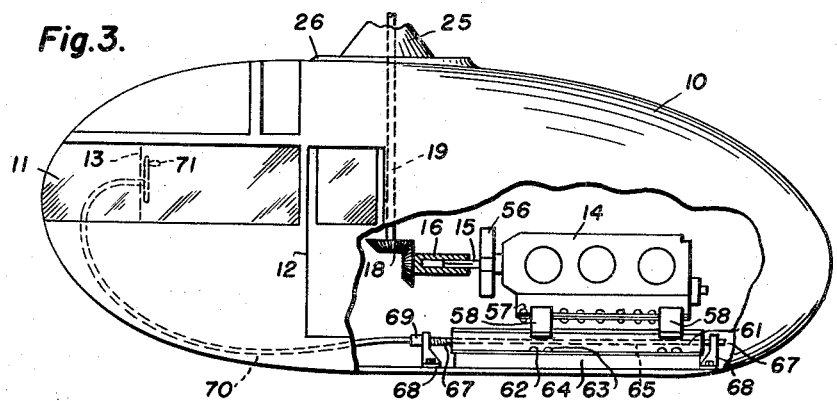
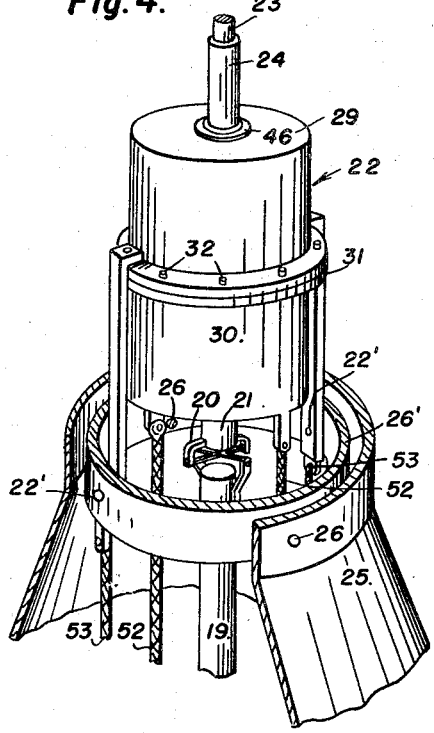
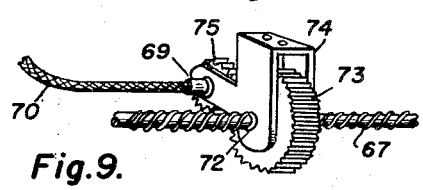
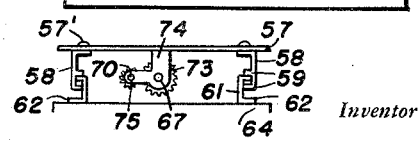
Inventor
Howard A. Kisner Patented Aug. 7, 1951

2,563,047

UNITED STATES PATENT OFFICE 2,563,047

HELICOPTER ROTOR CONTROL

Howard A. Kisner, Watson, W. Va.

Application June 19, 1947, Serial No. 755,692

6 Claims. (Cl. 170—135.26)

This invention relates to aircraft and more particularly to helicopters.

The object of the invention is to provide a novel helicopter control having means for varying the angles of disposition of the propellers in conjunction with a power drive means by which rotation is imparted to the propellers from the power plant or engine within the cabin of the aircraft or helicopter.

Another object of the invention is to provide novel means for adjusting the power plant or engine with respect to its location within the cabin or both on the fuselage, so as to properly balance the craft at all times, whether in flight or in landing or ascending by properly distributing the weight of the engine with respect to the cabin and the axis of rotation of the propellers.

Another object of the invention is to provide means for adjusting the position of the engine from the instrument board or dash within convenient reach of the pilot in the cabin of the helicopter, or for so adjusting the cabin on its fuselage.

Another object of the invention is to provide convenient means for adjusting the angle of position of the propellers used in both lifting and propulsion, in connection with controls for the driving mechanism thereof.

Another object of the invention is to provide control means for helicopters, which will render more safe the operation thereof and greatly facilitate control in flight as well as in landing or ascending, and which may be economically produced, easily mounted in position and operated efficiently for the purposes stated.

Other objects and advantages reside in the details of construction and operation as more fully hereinafter described and claimed, reference being had to the accompanying drawings forming part hereof, wherein like numerals refer to like parts throughout, and in which:

Figure 1 is a central sectional view of a driving mechanism embodied in association with means for varying the angle of pitch or inclination of the propellers for driving the same.

Figure 2 is a side elevation of a helicopter equipped in accordance with the invention.

Figure 3 is an enlarged side elevation partly broken away showing the control device and means for driving the propellers and adjusting the position of the engine to balance the machine, the propellers being omitted and the cabin broken away to show the interior structure.

Figure 4 is a fragmentary perspective view showing the mounting of the gear drive for changing the angular position or inclination of the propellers and control means therefor.

Figure 5 is a sectional end elevation on an enlarged scale of the engine mounting and adjusting structure shown in Figure 3.

Figure 6 is a fragmentary side elevation of a portion of the fuselage and of a helicopter and showing another form of adjusting device for the cabin and engine to balance the machine.

Figure 7 is a sectional view taken on the line 7—7 of Figure 1.

Figure 8 is a front elevation corresponding to Figure 5 of the adjusting means shown in Figure 6, and Figure 9 is a fragmentary perspective view of the drive means for adjusting the engine in the form shown in Figures 6 and 8.

Referring to the drawings in detail, 10 designates the cabin of the helicopter shown especially in Figures 2, 3 and 6 of the drawings which may be provided with the usual or conventional landing gear and having at the nose thereof, the usual windows 11 through which the pilot may observe the flight of the machine and a door 12 for making entrance and exit to and from the cabin. An instrument board or dash 13 is supported at the front of the cabin in convenient view and reach of the pilot and is adapted to support the usual controls and instruments for observing meteorological conditions, altitude, speedometer and the like, as well as control devices for the operation of the balancing means and inclination of the propellers as will be later described. The engine is designated at 14 and has telescopic or sliding connection at its shaft 15 or an extension thereof extending forwardly of the engine in coupled relation to a sleeve 16 suitably supported adjacent thereto so that the sleeve or hollow shaft 16 will be driven during the operation of the engine. At the forward end of the sleeve or shaft 16 is a gear 17 which meshes with and drives a gear 18 from which a vertical drive shaft 19 extends upwardly and is universally coupled at 20 to a shaft 21 extending vertically thereabove for driving a gear mechanism within a gear box or housing 22 which, in turn is adapted to drive two concentric shafts fitted one within the other consisting of an inner shaft 23 and an outer tubular shaft 24. The shaft 19 extends up through a downwardly enlarged bearing member 25 secured by its base plate 26 to the top of the cabin 10, and the shafts 23 and 24 bear on their upper ends, the respective upper and lower propellers 27 and 28 for propelling the machine as well as for lifting the same in ascending and controlling the descension or landing thereof, and for steering in either direction by slowing one propeller or the other, with or without a rudder and ailerons. These propellers are adapted to rotate in opposite directions, as indicated by the arrows in Figure 2 of the drawings, the propeller 27 being fixed to the upper end of the shaft 23, while the propeller 28 is fixed to the upper end of the tubular shaft 24, both extending upwardly from the gear box 22 and pivoted for universal movement at the joint 20 for fore and aft tilting movement in the bearing member 25 on trunnions 26 by means of a ring 26', in which the gear box 22 is pivoted longitudinally for lateral tilting movement on trunnions 22' extending forwardly and rearwardly from the gear box 22 in line with or the same horizontal plane as the universal joint 20 to permit the shafts and propellers to be tilted in different angles for turning and banking the aircraft. The gear box 22 comprises upper and lower sections 29 and 30 having peripheral flanges 31 bolted together as at 32. The main gear box or housing 22 contains a driving mechanism or gears for driving the shafts 23 and 24 in opposite directions and thus also propellers 27 and 28 fixed to the upper ends thereof. For this purpose, the drive shaft 21 extends up through a packing gland 30' centrally at the bottom of the section 30 of the gear box or housing through an anti-friction bearing 44' and has fixed thereto so as to slide vertically on the shaft 21, by means of a spline 33, a sleeve 34 provided on its upper end with a clutch plate 35 with a friction upper surface adapted to engage the bottom of an auxiliary or spider housing 36 within the gear box or housing 22. The shaft 21 then extends through a vertical thrust bearing 37 having a sleeve 38 extending from a lower bevel gear 39 horizontally positioned and formed with the sleeve 38, which extends downwardly through the bearing 37. The spider housing 36 supports a horizontal shaft 40 at its ends for rotation in the sides of the spider housing 36 in bearings 41. Vertical bevel gears 42 rotate on or are fixed to the shaft 40 and mesh with an upper horizontal bevel gear 43 having its hub connected to the shaft 23 at the lower end of the latter and journalled in an upper end thrust bearing 44 at the top of housing 36. The top of the inner housing 36 is fixed to or formed with the tubular shaft 24, an end thrust bearing 45 is interposed between the top of the housing 36 and the top of the section 29 of the gear box or housing 22, above which, the shaft 24 turns in a bearing 46 on top of the latter housing. A brake or clutch band 47 operated by a suitable lever and control cable 48 from the dash, is provided around the inner or spider housing 36 and when loose, shafts 23 and 24 are driven at the same speeds but in opposite directions to propel the craft and prevent spinning thereof. When band 47 is applied to grip and retard and slow or hold the housing 36 against rotation it throws torque on the shaft 23 and rotation of the shaft 21 will be transmitted through the gears 39, 42, and 43 to the shaft 23 and upper propeller 27, while shaft 24 and lower propeller 28 run slower or are held. When the clutch 35 is engaged and the band 47 is released the outer shaft 24 and lower propeller 28 are driven at higher speed than shaft 23 and propeller 27, rotation being imparted to the shaft 24 through the housing 36 while said gears rotate therewith and the shaft 23 is driven thereby at a lower speed, in which instance the gears 42 also roll on or planetate around gears 39 and 42. This provides means for independently driving the shafts 23 and 24 at the same or different speeds and thus the propellers 27 and 28 connected thereto, in opposite directions for travelling in a straight course or turning. The combined R. P. M. of the shafts 23 and 24 always equal the R. P. M. of the shaft 19, or are equal thereto, depending on the drive connections or gearing and gripping, braking or holding means described. In order to shift the clutch 35, the sleeve 34 thereof is provided with a groove 34' engaged by a fork 35' fixed to a rod 49 pivoted in the sides of the section 30 of the gear box or main housing 22 and having an arm or lever 50 at one end, which may be operated by a suitable control cable 51 extending from the dash. In addition, control cables 52 extending from the dash, are also provided for tilting the gear box or housing on the trunnions 22' fore and aft, and similar cables 53 are provided on the gear box or housing 22 to pivot the gear housing laterally to either side on the trunnions 26 to thus tilt the shafts 23 and 24 and the propellers 27 and 28 fixed to said shafts, so as to control banking, tilting, turning, ascent and descent in addition to direction of travel in flight, which may be assisted by any other control means or rudder and elevators or ailerons if so desired. This, of course, is permitted by the universal joint coupling 20 between the shafts 19 and 21, as shown in Figure 3 of the drawings. It is also understood that the machine is provided with the usual joy stick 54 in the cabin, adjacent the seat 55 of the pilot and the dash 13 previously described.

The balancing of the machine so as to maintain a true horizontal position is effected by mounting the engine or motor 14 for longitudinal adjustable movement fore and aft for counterbalancing with the weight of the passengers in the cabin. As shown in Figures 3 and 5, the engine 14 and its flywheel 56 are bolted as at 57' at the base of the motor through flanges 57 of the crankcase, to the inwardly extending top flanges of channels 58 at the sides thereof, the lower portions of the channels having spaced longitudinal flanges or rails 59 sliding on outwardly extending flanges or guide rails 60 at the upper edges of channels or tracks 61 bolted through outwardly extending bottom flanges 62 as at 63, to a base 64. A worm nut or block 65 is bolted as at 66 to the bottom of the crankcase of the motor and the worm nut is engaged by a worm shaft 67 journalled in bearings 68 in front and in back of the base and track rails, upon which the motor is slidably supported, which track rails are considerably longer than the motor and the rails or channels 58 fixed thereto so as to allow the necessary sliding movement back and forth. The forward end of the worm shaft 67 is coupled as at 69 to a flexible shaft or cable 70 which extends through the dash 13 and is adapted to be turned by a crank wheel 71 to slide the motor and balance the helicopter with the passengers. This construction is adapted primarily for use on small machines, while on larger machines or cargo ships, for adjusting the motor 14 and cabin 10 relative to the fuselage 10', the construction shown in Figures 6, 8, and 9 is employed.

In the construction shown in Figures 6, 8 and 9, the motor is stationary or similarly slidably supported, but the shaft 67 operated through a worm nut 72 or worm threads provided within a large spur gear 73 journalled in a hanger or bearing 74 suspended from the bottom of the motor crankcase, which also rotatably supports a smaller spur gear 75 in mesh with the larger gear 73 and having connection with the cable 70 at the coupling 69, so that the cabin and a larger motor can be moved with greater ease to shift the motor and cabin 10 relative to the fuselage 10' forward and backward by hand control and maintain the weight of the machine balanced.

From the foregoing, it is believed that the operation of the machine will be readily apparent and it will be seen that I have provided an efficient balancing device for helicopters and control means whereby the driving of the propellers may be readily effected by the pilot in tilting the propellers fore and aft, as well as laterally, to control the machine in flight as well as in ascending and landing.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a helicopter, the combination with a cabin thereof, a motor mounted therein and having a drive shaft, a vertical shaft driven from the motor drive shaft, a downwardly enlarged bearing member supported on the cabin, a gear housing supported in said bearing member for lateral and longitudinal tilting movements relative to the cabin on longitudinal and transverse axes, said vertical shaft extending up into said gear housing, a shiftable clutch plate splined on the upper portion of the vertical shaft within the gear housing, means for shifting said plate, an auxiliary housing within the gear housing and adapted to be engaged by said clutch plate, means to hold said auxiliary housing against movement or permit rotation thereof, a first horizontal gear on the upper end of the vertical shaft, vertical gears journalled in the sides of the auxiliary housing and engaging the first horizontal gear, a second horizontal gear meshing with the vertical gears, a shaft fixed to the second horizontal gear and extending upwardly through the gear housing, a tubular shaft fixed to the top of the auxiliary housing and extending through the gear housing around the last-named shaft, and propellers fixed to the upper ends of the two last-named shafts.

2. In a helicopter, the combination with a cabin thereof, a motor mounted therein and having a drive shaft, a vertical shaft driven from the motor drive shaft, a downwardly enlarged bearing member supported on the cabin, a gear housing supported in said bearing member for lateral and longitudinal tilting movements relative to the cabin on longitudinal and tranverse axes, said vertical shaft extending up into said gear housing, a shiftable clutch member splined on the upper portion of the vertical shaft within the gear housing, means for shifting said clutch member up and down, a rotatable auxiliary housing within the first housing and adapted to be engaged by said clutch member, means to hold said auxiliary housing against movement, a first horizontal gear on the upper end of the vertical shaft, vertical gears journalled in the sides of the auxiliary housing and engaging the first horizontal gear, a second horizontal gear meshing with the vertical gears, a shaft fixed to the second horizontal gear and extending upwardly through the gear housing, a tubular shaft fixed to the top of the auxiliary housing and extending through the gear housing around the last-named shaft, and propellers fixed to the upper ends of said latter shafts and pitched and rotating in opposite directions.

3. In combination, a helicopter having a cabin, a motor mounted therein and having a drive shaft, a vertical shaft driven from the motor drive shaft, a tubular bearing member supported on the cabin, a gear housing supported in said bearing member for lateral and longitudinal movements relative to the cabin on longitudinal and transverse axes, a vertical shaft extending up into said gear housing, a shiftable clutch member non-rotatably and slidably carried by the shaft within the gear housing, means for shifting said clutch member, a rotatable auxiliary housing within the gear housing and adapted to be engaged by said clutch member, means to hold said auxiliary housing against turning, a first horizontal gear on the upper end of the vertical shaft, vertical gears journalled in the sides of the auxiliary housing and engaging the first horizontal gear, a second horizontal gear meshing with the vertical gears, a shaft fixed to the second horizontal gear and extending upwardly through the auxiliary housing and the gear housing, a tubular shaft fixed to the top of the auxiliary housing and extending through the gear housing around the last-named shaft, and oppositely pitched propellers fixed to the upper ends of the two last-named shafts and rotatable in opposite directions.

4. In a helicopter, the combination with a cabin thereof, a motor mounted therein and having a drive shaft, a vertical shaft driven from the motor drive shaft, a downwardly extending bearing member supported on the cabin, a gear housing supported in said bearing member and adapted to be tilted laterally and longitudinally relative to the cabin on longitudinal and transverse axes, said vertical shaft extending up into said gear housing, a shiftable clutch member non-rotatably and slidably carried by the upper portion of the vertical shaft within the gear housing, a rotatable housing within the gear housing, means for shifting said clutch member to engage the rotatable housing, means to hold said rotatable housing against rotation, a pair of horizontal gears one fixed to the upper end of the vertical shaft, a second vertical shaft above the first shaft in alignment therewith and carrying the other horizontal gear, vertical parallel gears journalled in the rotatable housing, each of said vertical gears enmeshing with said horizontal gears for effecting relatively opposite rotation of said vertical shafts, a tubular shaft fixed to the top of the rotatable housing and extending up around the second vertical shaft, and propellers fixed to the upper ends of the two last-named shafts.

5. The combination with a cabin of an airplane of the helicopter type, a motor mounted therein and having a drive shaft, a vertical shaft driven from the motor drive shaft, a bearing member supported on the cabin, a ring pivoted at diametrically opposite points on horizontal axes within the upper end of the bearing member, a gear housing above said ring and pivoted thereto at a point beneath the same on horizontal axes within the ring at right angles to the first axes, a housing rotatable within said gear housing and having meshing pairs of horizontal and vertical gears therein, a shaft depending axially from one of the horizontal gears and having a universal connection with the upper end of the vertical shaft in alignment with said axes and within the ring and the bearing member at the upper end of the latter, releasable means to hold said rotatable housing against rotation, a shaft extending up through the rotatable housing and the gear housing and connected to the other horizontal gear, a tubular shaft fixed to the upper end of the rotatable housing and surrounding the last-named shaft, and propellers fixed to the upper ends of the two last-named shafts and pitched to rotate in opposite directions, said vertical gears each being enmeshed with both of said horizontal gears for effecting relatively opposite rotation of said horizontal gears whereby said propellers will rotate in opposite directions.

6. In a helicopter, a cabin, a motor in the cabin, a vertical shaft operatively connected to the motor and extending through the top of the cabin, a ring mounted on top of the cabin in concentric surrounding relation to the upper end of said shaft for tilting movement laterally of the cabin, a gear housing mounted on said ring for tilting movement longitudinally of the cabin, a rotatable housing in said gear housing, a second vertical shaft extending through and journalled in the bottoms of said gear housing and said rotatable housing and universally connected at its lower end to the upper end of the first-named shaft, a gear secured on the upper end of said second shaft, a third vertical shaft extending through and journalled in the tops of said gear housing and said rotatable housing, a second gear secured on the lower end of said third shaft, pinions journalled in said rotatable housing and arranged between and meshing with said horizontal gears, a tubular shaft extending through and journalled in the top of said gear housing and fixed at its lower end to said rotatable housing, said third shaft being extended through said tubular shaft, propellers of opposite pitch secured on the upper ends of said third shaft and said tubular shaft, manually releasable means selectively clutching the second shaft to the rotatable housing for rotation therewith, manually releasable means selectively to hold the rotatable housing against rotation relative to the gear housing, manually operable means in said cabin and connected to said ring to tilt and control tilting of the ring, and manually operable means in said cabin and connected to the gear housing to tilt and control tilting of the gear housing.

HOWARD A. KISNER.

REFERENCES CITED

The following references are of record in the file of this patent:

UNITED STATES PATENTS

| Number | Name | Date |
|---|---|---|
| 1,055,533 | Highland | Mar. 11, 1913 |
| 1,291,126 | Porter | Jan. 14, 1919 |
| 1,541,534 | Souder | June 9, 1925 |
| 1,578,833 | Kogler | Mar. 30, 1926 |
| 2,037,745 | Vaughn | Apr. 21, 1936 |
| 2,170,733 | Sharpe | Aug. 22, 1939 |